United States Patent
Rihtamo et al.

(10) Patent No.: US 6,596,050 B1
(45) Date of Patent: Jul. 22, 2003

(54) PROCEDURE AND APPARATUS FOR THE TREATMENT OF WASTE

(75) Inventors: Heikki Rihtamo, Helsinki (FI); Hannu Laukkanen, Savonlinna (FI)

(73) Assignee: Merinonita Oy, Loviisa (FI)

( * ) Notice: Subject to any disclaimer, the term of this patent is extended or adjusted under 35 U.S.C. 154(b) by 0 days.

(21) Appl. No.: 09/485,742

(22) PCT Filed: Aug. 14, 1998

(86) PCT No.: PCT/FI98/00629

§ 371 (c)(1),
(2), (4) Date: Aug. 17, 2000

(87) PCT Pub. No.: WO99/08754

PCT Pub. Date: Feb. 25, 1999

(Under 37 CFR 1.47)

(30) Foreign Application Priority Data

Aug. 15, 1997 (FI) .................................. 973367

(51) Int. Cl.$^7$ .......................... C05F 11/08; C12M 1/00
(52) U.S. Cl. ................. 71/9; 71/11; 435/290.1; 435/290.4
(58) Field of Search .................. 435/262, 290.1, 435/290.4, 286.5; 71/9, 11

(56) References Cited

U.S. PATENT DOCUMENTS

| | | | | |
|---|---|---|---|---|
| 2,062,264 A | * | 11/1936 | Goldsborough | 435/290.1 |
| 4,882,058 A | * | 11/1989 | Burton | 210/150 |
| 5,185,261 A | * | 2/1993 | Warrington | 435/290.1 |
| 5,457,031 A | * | 10/1995 | Masse | 220/4.28 |
| 5,695,986 A | | 12/1997 | Wold et al. | 435/290.1 |
| 5,766,876 A | * | 6/1998 | Santiago et al. | 435/290.1 |
| 6,159,726 A | * | 12/2000 | Kohr | 423/22 |
| 6,335,192 B1 | * | 1/2002 | Ostbo | 4/484 |

FOREIGN PATENT DOCUMENTS

| | | |
|---|---|---|
| CH | 688 476 | 10/1997 |
| DE | 1 918 343 | 10/1969 |
| DE | 36 32 337 | 3/1988 |
| DE | 4031862 A1 * | 4/1992 |
| DE | 42 33 545 | 1/1994 |
| DE | 42 06 794 | 2/1994 |
| DE | 42 30 635 | 3/1994 |
| DE | 43 11 093 | 10/1994 |
| DE | 195 34 800 | 7/1997 |
| FI | 52075 | 6/1977 |
| NO | 177992 | 9/1995 |
| SE | 463 312 | 11/1990 |
| WO | 97/11794 | 4/1997 |

* cited by examiner

*Primary Examiner*—David A. Redding
(74) *Attorney, Agent, or Firm*—Andrus, Sceales, Starke & Sawall, LLP

(57) ABSTRACT

The invention relates to a procedure and an apparatus for microbiological treatment of waste containing harmful substances. According to the invention, the waste is loaded into a waste treatment reactor (2), which comprises a bottom (1a), a cover (1b) and walls (1c, 1d). Organic matter is added to the waste and the properties of the waste material and the conditions are adjusted so as to make them favorable for bacterial activity. The waste is treated in the reactor substantially without agitation, and a sufficient amount of oxygen, moisture and/or nutrients is added into the waste material. The reactor of the invention comprises at least a cover $91b0$ openable from above and/or openable wall ($1c$, $1d$) to allow waste material to be loaded into the reactor. The reactor further comprises a substantially immovable sieve plate 911) and a pipe system (4, 5) placed at at least one level for the supply of oxygen, moisture, nutrients and/or steam while the waste material remains substantially immovable in the reactor during the treatment. The apparatus substantially permits transportation to the place of waste treatment.

20 Claims, 2 Drawing Sheets

PROCEDURE AND APPARATUS FOR THE TREATMENT OF WASTE

BACKGROUND OF THE INVENTION

The present invention relates to a procedure as defined in the claims and to an apparatus as defined in the claims for microbiological treatment of waste containing harmful substances.

In prior art, a procedure for the treatment of hazardous waste, especially oil-containing hazardous waste is known. In the procedure, to make hazardous waste harmless to the environment, the waste is stacked on the ground and treated with bacteria that use it for nutrition. A problem with this procedure is that it is difficult to maintain conditions and properties in the hazardous waste, e.g. temperature, humidity and pH value, that are optimal for bacterial activity. Another problem is that hazardous waste contains substances harmful to the environment, e.g. heavy metals, which remain unchanged regardless of bacterial activity and drift into the soil surrounding the stack.

In the context of the present invention, hazardous waste refers to waste that contains substances or compounds harmful e.g. to people, animals and/or the environment and that are to be prevented from getting into the soil, air or water systems, especially earth material, such as sand, clay, humus or the like, containing oil or its distillate fractions.

SUMMARY OF THE INVENTION

The object of the present invention is to eliminate the drawbacks described above.

A specific object of the present invention is to disclose a procedure that makes it possible to adjust and maintain optimal conditions for bacterial activity in hazardous waste and thus to achieve controlled improvement in the treatment of hazardous waste.

A further object of the invention is to disclose an apparatus for implementing the procedure, which can be used to prevent undecomposable environmental poisons from getting into the soil, atmosphere and water systems.

The invention is based on microbiological treatment of waste containing harmful substances. The waste is loaded into a waste treatment reactor, organic matter is added to the waste and the properties and conditions of the waste material are adjusted so as to make them favourable for bacterial activity. According to the invention, the waste is treated in the reactor substantially without agitation, and a substantially sufficient amount of oxygen, moisture and/or nutrients is supplied into the waste material.

In an embodiment of the procedure, oxygen, moisture, nutrients, organic matter and/or steam is/are added into the waste material during treatment to adjust the conditions.

According to an embodiment, nitrogen and/or moisture is added into the waste material substantially in conjunction with loading. Nitrogen can be added in the form of any kind of solution, e.g. 5% nitrogen solution. The amount of nitrogen solution may be e.g. 1–100 kg/25 $m^3$ of waste material.

In an embodiment, oxygen, moisture, nutrients and/or steam is/are added via a pipe system placed at at least one level in the reactor substantially between the waste material. The pipe system may be of a disposable nature to facilitate the unloading of the waste from the reactor.

In an embodiment, organic matter is loaded in the reactor in layers, alternately with waste. The amount of organic matter loaded into the reactor may be e.g. 3–50% of the total mass of the material. The organic matter may consist of e.g. peat, shavings, wood chips, bark, straw and/or other lignocellulose based or other organic matter. A preferred kind of organic matter is bark chips.

According to an embodiment, heavy metals are washed off from the waste material and recovered. In an embodiment of the invention, the liquid used in the waste treatment process can be recirculated.

In an embodiment, aerobic and anaerobic alternation is employed. Alternation of oxidation-reduction areas can also be used in the procedure.

The invention allows hazardous waste, especially oil-containing hazardous waste, to be made harmless to the environment by treating it in a closed space in conditions optimal for the activity of bacteria that use the hazardous waste for nutrition. The treatment is fast and the dangerous substances contained in the hazardous waste can be easily reclaimed e.g. together with water/liquid/gas separated from the waste. From gases to be discharged into the atmosphere, harmful substances, such as VOC compounds (Volatile Organic Compounds), can be recovered by using a special filter before discharge of the gases into the atmosphere. From contaminated liquid/water, e.g. heavy metals can be recovered.

A further advantage of the procedure of the invention is waste treatment without agitation, which makes composting considerably easier.

A further advantage of the apparatus of the invention is that it can be transported to the place of treatment of thee waste, e.g. contaminated soil, which means that the treatment involves no waste transport expenses. Another advantage of the apparatus is that it is applicable in cold conditions, e.g. due to thermal insulation and steam supply.

In addition, the procedure and apparatus provide the advantage of simple and cheap composting and energy-saving operation.

BRIEF DESCRIPTION OF THE DRAWING

In the following, the invention will be described by the aid of an example of its embodiments by referring to the attached drawings, in which.

DETAILED DESCRIPTION OF THE INVENTION

In the procedure of the invention, waste, preferably contaminated soil, containing harmful substances detrimental to people, animals and/or the environment, is treated. Such substances include various hydrocarbon compounds, heavy metals, sulphides, cyanides, halogen compounds, etc. Of oil-containing materials, the waste usually contains gas oil or heavier hydrocarbons, such as diesel and fuel oil or crude oil.

The waste is treated in an apparatus as provided by the invention substantially without being agitated during the treatment.

Figure 1:
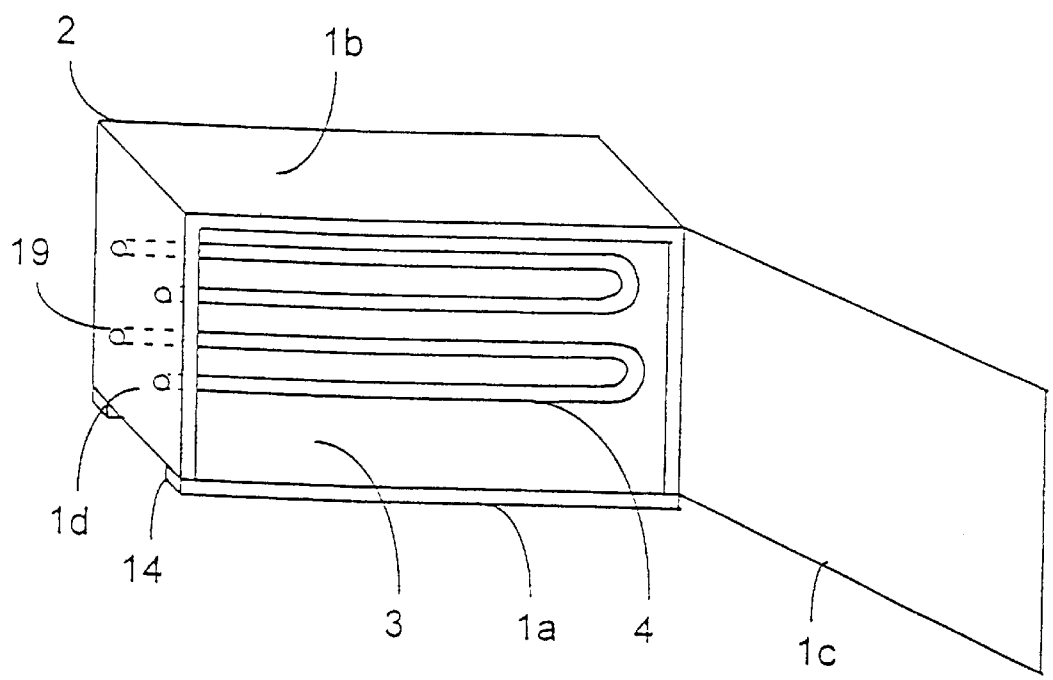
FIG. 1 presents an apparatus according to the invention, opened and in lateral view.
Figure 2:
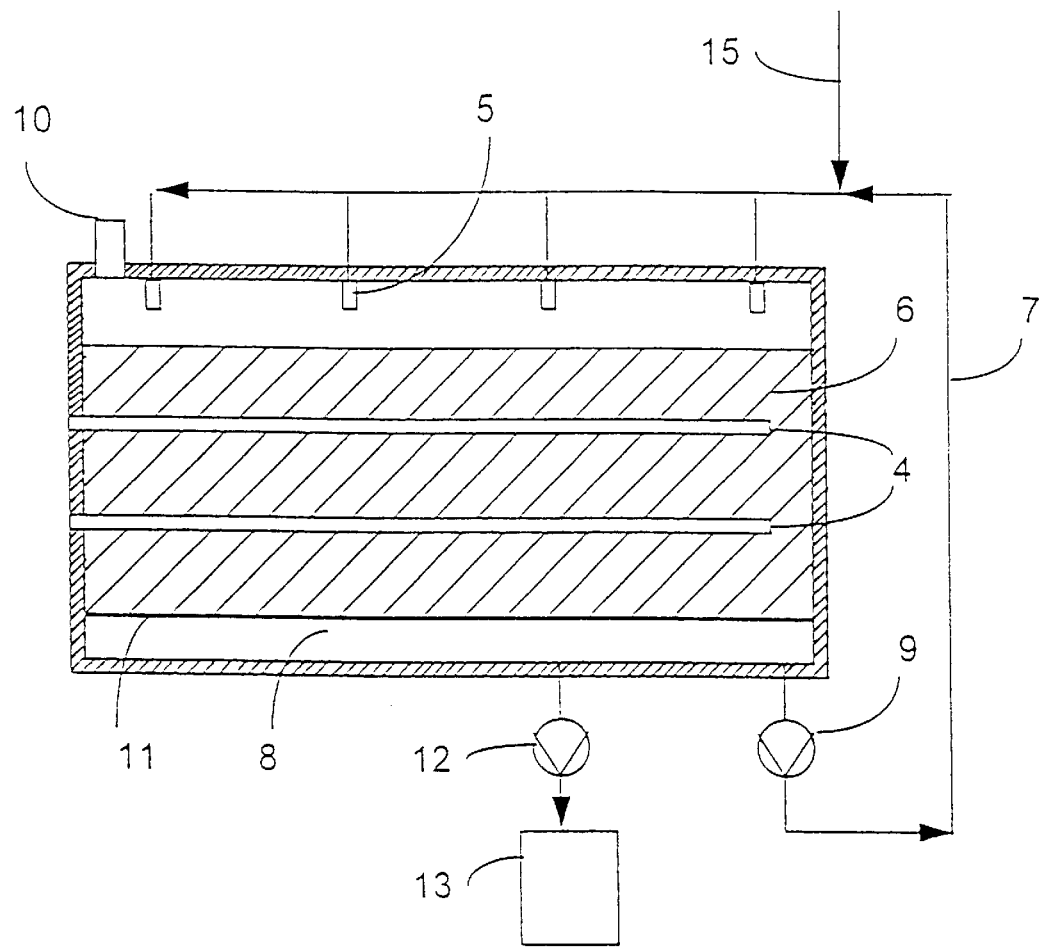
FIG. 2 presents a cross-section of the apparatus in FIG. 1.
Figure 3:
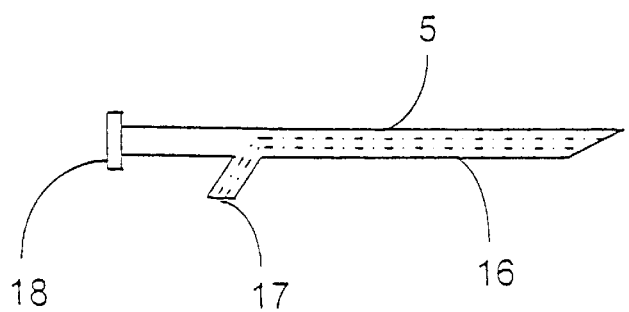
FIG. 3 presents a detail of the apparatus in FIG. 1.

The apparatus presented in FIGS. 1–3 comprises a reactor 2 for the treatment of hazardous waste, which can be called a static bioreactor. The reactor comprises a treatment space 3 delimited by a bottom wall 1a, a top wall 1b and side walls 1c and 1d. In the embodiment described, the reactor for the treatment of hazardous waste is a mainly container-like structure.

In the embodiment described, the walls 1 (1a, 1b, 1c and/or 1d) may be provided with full or partial thermal insulation. The thermal insulation may be implemented by adding to the outside of the reactor 2 a layer of insulating material, which may consist of e.g. insulating wool or other insulating material, such as polyurethane based material, with a sheet metal covering placed on top of it. The reactor may naturally also be implemented without thermal insulation.

The top wall 1b and/or one or more of the side walls 1c and 1d and/or the bottom wall 1a may be completely or partially openable so that the material to be treated or other materials can be fed into the reactor and removed from it. The top wall, i.e. the cover 1b, may be of structure that opens like a folding door. Further, e.g. one or both of the end walls may be provided with a door structure, which may be e.g. a two-part door of a sideways turnable type.

The apparatus, i.e. reactor 2 further comprises a substantially immovable sieve plate 11, on which the waste material 6 is loaded. The sieve plate may comprise a sieve, perforated plate, filter plate, filter cloth, membrane structure with supports, or the like, and/or ceramic/inert pellets, balls or equivalent bodies or the like.

The reactor may be implemented as a substantially tight and fully closed structure, so it is possible to create an underpressure in the reactor if necessary and waste treatment can be effected by utilising aerobic and anaerobic alternation as well as alternation of different redox areas (oxidation-reduction areas). The reactor may also be partially closed or partially covered or substantially open.

The reactor 2 can be provided with feed devices 4 and/or 5 for feeding moisture, nutrients, oxygen, steam and/or solid matter into the reactor.

The apparatus preferably comprises a pipe system 4 mounted at at least one height level in the reactor, and the pipe system lead-in 19 into the reactor may be disposed e.g. in side wall 1c or end wall 1d. The pipe system is preferably mounted inside the reactor substantially between the waste material 6. In an embodiment, there may pipe systems placed at at least two levels in the reactor. Via the pipe system, moisture, nutrients, oxygen and/or steam can be supplied into the waste material during the treatment. Steam can be used for the adjustment of temperature e.g. in cold conditions.

The pipe system 4 can be built e.g. from plastic draining pipe provided with holes. The use of draining pipe is a cheap and easy solution. The pipe system may be of a disposable nature, in which case the pipe system need not be considered when processed material is being unloaded from the reactor.

In an embodiment of the invention, the apparatus may comprise distributing elements 5, which are placed e.g. in the upper part of the reactor 2. Through the distributing elements, such as nozzles, it is possible to apply a uniform supply of liquid and/or nutrients in the form of a spray/jet from above onto the surface of the waste material 6. The liquid fed into the reactor may be liquid obtained from a recirculation system 7 or liquid 15 supplied from outside the apparatus. Via the distributing elements, it is also possible to supply oxygen and/or steam into the reactor.

The apparatus may also comprise separate feed pipe systems for the supply of oxygen, steam, liquid and/or nutrients in addition to the feed devices 4 and/or 5 or instead of them. Each separate pipe system may comprise e.g. a nozzle 5 for supplying the relevant component into the treatment space 3 of the reactor.

In an embodiment, the nozzles 5 may be of a design e.g. like that presented in FIG. 3, i.e. they comprise a feed tube 16 with a pump connector 17, and an impact surface 18 to allow the nozzle to be forced through a closeable hole in the wall into the reactor space of the reactor 3 after the reactor has been filled. The nozzle can be forced into the reactor space e.g. by hitting it with a sledge hammer on the impact surface.

In an embodiment, aeration of the waste material can be effected via a pipe system on the bottom of the reactor 2 by supplying oxygen from the bottom into the bed of waste material 6.

The feed device for solid material may consist of e.g. any known feed device for solid material, such as a feed orifice, feed screw, conveyor or similar technical solution known in the art.

In an embodiment, the apparatus may further comprise a recirculation system 7 for circulating the liquid separated from the treatment space 3 back into the treatment space 3. The recirculation system may comprise, among other things, a liquid collecting space 8, located e.g. under the treatment space 3, for collecting the liquid to be recirculated, a pump 9 for pumping the liquid, and one or more distributing elements 5 for passing the liquid into the reactor. In the embodiment described, the liquid collecting space 8 is separated from the reactor space 3 by an intermediate floor, such as a sieve plate 11. The liquid collecting space can also be utilised as a water tank. The liquid collecting space may be e.g. a basin, container, a separate space or the like, and it may have a capacity of e.g. 1200 liters. The apparatus may also comprise a separate return space, which is located below the reactor. The recirculation system 7 is so designed that the liquid trickling into the return space is also returned back into the treatment space 3. The recirculation system may be provided with regulating elements, such as valves, to allow adjustment of recirculation as required.

The bottom of the reactor may be provided e.g. with transfer table rails 14 to achieve a sturdier reactor structure and to provide a base for it. The transfer table rails make it easier to lift the reactor e.g. onto a transport vehicle and/or to transport it to the place of waste treatment.

The treatment of hazardous waste is started by loading the waste material to be treated into the treatment space 3 of the reactor. In an embodiment, waste and organic matter are preferably loaded into the reactor alternately by layers in suitable proportions. A layer of e.g. 15 cm of organic material, such as bark chips, shavings, peat or the like, may be placed on the bottom of the treatment space 3. In a preferred case, the organic matter used may consist of pine bark chips. Upon the layer of organic matter, a layer of e.g. 50 cm of hazardous waste is added. On the hazardous waste, another thin layer of organic matter is spread, and again a layer of hazardous waste is placed on top of it. The number of layers may vary.

If desired, the waste and the organic matter can also mixed together before being loaded into the reactor. In both cases, the resulting bed of waste material will be spongy, which contributes towards successful aeration and uniform propagation of nutrients and/or moisture throughout the bed area.

The amount of organic matter to be added may vary depending on the waste being treated, e.g. between 3–50% of the total mass of the material. For instance in the treatment of clay based earth material, the amount of bark chips added may be e.g. about 30% of the total mass. In the treatment of arenous earth, the amount of bark chips needed is considerably smaller, e.g. about 5% of the total mass. The bark chips are usually screened to obtain substantially equal-sized chip material.

A bacterial stock can be added to the waste material, mixed in the organic matter, in the material to be treated or in the liquid or added separately. In the procedure, a suitable bacterial stock, e.g. a previously known or a new stock, can be used. The bacterial stock is selected on the basis of the waste to be treated and the harmful substances it contains. The procedure can also be implemented without an added bacterial stock.

The nutrients to be fed into the waste material during the treatment may be mixed e.g. with the liquid, in which case they will be fed in together with the moisture. Naturally, the nutrients may also be added in other ways, e.g. separately. Various additional nutrients besides nitrogen and oxygen can be used in the procedure.

If necessary, a nitrogenous mixture, which may be a solid, gaseous or liquid mixture, e.g. a nitrogen saltpetre solution, is added to the waste material. Bacteria use nitrogen for nutrition. The nitrogen saltpetre solution may be added e.g. in the form of a 5% water solution. The nitrogenous solution may naturally contain any percentage of nitrogen. The amount and strength of the nitrogen solution to be added depend on the nutritive values and moisture content of the waste to be treated, which are determined before the treatment. The nitrogen solution is usually added to the waste before the waste is loaded into the reactor or substantially in conjunction with the loading. The amount of nitrogen solution added is e.g. 1–100 kg/25 m$^3$ of waste material, in an embodiment e.g. about 40 kg.

Oxygen is added into the treatment space 3 in an aerobic procedure to regulate and accelerate the treatment process. The oxygen can be added in the form of air or oxygen gas. A surplus of oxygen/air may be supplied into the reactor. The exhaust air from the reactor may be passed via a valve 10 in the upper part of the reactor into the atmosphere. Usually a filter is used in conjunction with the valve.

The temperature of the waste material can be adjusted by using steam and/or warm water. In the procedure, the aim is to keep the temperature between 25–37° C., a preferred temperature being about 29° C. At these temperatures, generally no toxic gases are evaporated.

The humidity of the waste material is preferably maintained at a level that allows the material to remain fluffy, because if the material is too wet, the pores in it will be filled with water and the material will become oxygen-poor and impermeable. In a procedure according to the invention, the pH value is maintained at a neutral level.

As a final stage of the treatment, the waste material 6 may be flushed with water supplied via the distributing elements 5 placed e.g. in the upper part of the reactor (FIG. 2). The flush water flows through the waste material 6 and the sieve plate 11 into the liquid collecting space 8, from where it is pumped into a separate container 13. The flushing is performed e.g. 1–4 or more times. In the container, harmful substances, e.g. heavy metals, can be recovered from the water.

EXAMPLE 1

The procedure of the invention was tested in practice by composting earth mass containing fuel oil (III). In the experiment, 60 l of fuel oil (III) was mixed with 560 l of silty soil containing some mould, and the oil was allowed to soak into the earth mass. After this, the earth mass was mixed with 300 l of crushed hardwood, alder bark chips, grain size 5–8 mm, which had been soaked with 60 l of water treated with nitrogen saltpetre (500 g of nitrogen saltpetre/60 l of water). After this, a 10-cm layer of the same crushed hardwood correspondingly nitrogenised was placed on the perforated bottom grating of a composting reactor and the well-mixed oily earth mass, mixed with nitrogenised crushed hardwood, was placed on the crushed hardwood layer as described above.

At the beginning of the experiment, the temperature of atmospheric air was 12° C., the temperature of the earth mass was 15° C. and its humidity 42%. The mass was composted for 67 days, allowing it to decompose freely. During the composting time, the conditions in the reactor were monitored and the mass was treated as follows: After 4 days, the temperature on the outside of the container was 11° C., the temperature inside was 17° C., and the humidity in the container was 38%. After 9 days, air was blasted into the reactor for 2 hours at 400 l/h, after which the temperature inside the reactor was 20° C., humidity 36%. After 14 days, the reactor was aerated by 2×2 h at 400 l/h; the temperature on the outside was 16° C., inside 25° C., humidity 36%. After 21 days, a 10-cm layer of crushed hardwood was placed on top of the mass in the reactor, the outside temperature was 16° C., inside 25° C., humidity 34%. After 28 days, the mixture was aerated by 2×2 h at 400 l/h; the temperature inside the reactor was 31° C., humidity 32%, and about 0.5 l of trickling water had gathered in the liquid collecting basin. After 29 days, warm water was added into the mass; the temperature of atmospheric air was 17° C., and a new 10-cm layer of crushed hardwood was placed on top of the mass. On the 35$^{th}$ day, the mass was aerated by 2×2 h at 400 l/h; the temperature of atmospheric air was 16° C., the temperature inside was 34° C. and humidity 30%. After 40 days, the temperature outside was 19° C., inside 38° C. and humidity 30%; the amount of trickling water gathered in the liquid collecting basin was 1.5 l. After 46 days, the pH of the mass was 7. After 50 days, 20 l of warm water was added into the mass, the reactor was aerated by 2×2 h at 400 l/h; the temperature inside was 40° C., humidity 28%. After 61 days, the temperature inside was 45° C., outside 21° C. and humidity 25%.

After 67 days, the reactor was emptied; at this time, the temperature outside was 19° C., inside 43° C. and humidity 27%. The amount of trickling water gathered in the liquid collecting basin during the whole composting period was 2.9 l. The earth mass thus treated was mellow and no oil was detected in it.

EXAMPLE 2

Two so-called static reactors, i.e. containers were loaded with oil-containing, clay-based earth mass and pine bark chips in alternate layers. The amount of bark chips was about 30% of the total mass. Each container had a capacity of about 30 m$^3$, of which about 25 m$^3$ was in composting use during the experiment. The pipe systems for the supply of oxygen, moisture and nutrients were arranged at two levels between the waste material, the first level being located at about ⅓ of the container height as seen from the bottom part of the container and the second level at about ⅔ of the container height.

The oil content of the contaminated earth mass was at most 10,000 mg/kg of dry matter before the experiment.

Oxygen was supplied in the form of air into the reactors during the treatment. 270 m$^3$ of air was added during one hour into each container once a week.

The temperature of the waste material during the treatment was about 29° C. on an average, but in the middle part of the waste material bed the temperature could temporarily rise to 34° C. The relative humidity was maintained at the level of 80%.

Nutrients mixed in water were added into the reactors once a week. A neutral pH value of the waste material was maintained during the composting experiment.

The composting experiment lasted 68 days, after which two representative composite samples were taken from each container. In the first container, the hydrocarbon content had fallen to a level of 292–397 mg/kg of earth, and in the second container to a level of 467–564 mg/kg of earth. These hydrocarbon content values were within the limits of acceptability for admission to a dumping area.

The invention is not restricted to the examples of its embodiments described above, but many variations are possible within the scope of the inventive idea defined by the claims.

What is claimed is:

1. A procedure for the microbiological treatment of waste containing harmful substances comprising the steps of:
    loading the waste into a waste treatment reactor;
    adding organic matter to the waste, the waste and the organic matter being loaded into the reactor in layers alternately with each other to form a mass of waste material in the reactor;
    supplying a substantially sufficient amount of oxygen, moisture, and/or nutrients onto the surface of the waste material and/or between the waste material at at least one level; and
    adjusting the properties and conditions of the waste material in the reactor during the treatment process so as to make them favorable for bacterial activity,
    the waste material being treated in the reactor substantially without agitation.

2. A procedure as defined in claim 1 in which oxygen, moisture, nutrients, organic matter and/or steam is/are added into the waste material during the treatment to adjust the conditions.

3. A procedure as defined in claim 1 in which nitrogen and/or moisture is added into the waste material substantially in conjunction with the loading.

4. A procedure as defined in claim 1 in which a 5% nitrogen solution is added in an amount of 1–100 kg/25 m$^3$ of waste material.

5. A procedure as defined in claim 1 in which oxygen, moisture, nutrients, and/or steam is/are added via a pipe system placed at at least one level in the reactor substantially between the waste material.

6. A procedure as defined in claim 5 in which the oxygen, moisture, nutrients and/or steam is/are added by a disposable pipe system to allow easier unloading of the waste after the treatment.

7. A procedure as defined in claim 1 in which the amount of organic matter loaded into the reactor is substantially 3–50% of the total mass.

8. A procedure as defined in claim 1 in which the organic matter is bark chips.

9. A procedure as defined in claim 1 further including the steps of washing heavy metals from the waste material and recovering the heavy metals.

10. A procedure as defined in claim 1 in which liquid used in the waste treatment process is recirculated.

11. A procedure as defined in claim 1 in which aerobic and anaerobic conditions are alternately employed in the procedure.

12. A procedure as defined in claim 11 in which oxidation-reduction areas are alternately employed in the procedure.

13. Apparatus for the microbiological treatment of waste containing harmful substances, said apparatus comprising:
    a container (2) having a bottom (1a), a cover (1b) that can be opened from above the container, and/or a well (1c,1d) that can be opened, said container forming a treatment rector and having a substantially immovable sieve plate (11) onto which waste to be treated and organic matter are loaded in layers to form a mass of waste material (6);
    feed devices (5) disposed substantially in an upper portion of the reactor for supplying oxygen, moisture, and/or nutrients onto the surface of waste material in the reactor; and
    a pipe system (4) placed at at least one level of the reactor for supplying oxygen, moisture, and/or nutrients between the waste material to treat the waste material, the waste material remaining substantially unmoved in the reactor during treatment,
    said apparatus being formed to permit transportation of the apparatus to a place of waste treatment.

14. An apparatus as defined in claim 13 in which a pipe system lead-in (19) into the reactor (2) goes through an end wall or a side wall (1c, 1d), and the pipe system (4) is placed inside the reactor substantially between the waste material (6).

15. An apparatus as defined in claim 13 in which the pipe system (4) is formed of a disposable material.

16. An apparatus as defined in claim 13 wherein the apparatus further comprises distributing elements (5) placed in the upper portion of the reactor (2) for uniform supply of moisture, nutrients, steam and/or oxygen into the waste material (6).

17. An apparatus as defined in claim 13 wherein the apparatus further comprises a liquid collecting space (8) for gathering liquid trickling from the waste material (6), at least one pump (12) for pumping the liquid, and a separate container (13) for the recovery of liquid having a heavy metal content.

18. An apparatus as defined in claim 13 wherein the apparatus comprises at least one recirculation pump (9) for circulating liquid to the reactor.

19. An apparatus as defined in claim 13 wherein the reactor includes means (14) for facilitating movement/lifting of the apparatus.

20. An apparatus as defined in claim 13 wherein the apparatus is a substantially fully closed system.

* * * * *